(12) United States Patent
Shimizu et al.

(10) Patent No.: US 8,047,831 B2
(45) Date of Patent: Nov. 1, 2011

(54) MOLD UNIT AND MODULE FOR ELECTRICAL CONNECTION

(75) Inventors: Isanori Shimizu, Makinohara (JP); Shinobu Suzuki, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/483,327

(22) Filed: Jun. 12, 2009

(65) Prior Publication Data

US 2009/0325405 A1    Dec. 31, 2009

(30) Foreign Application Priority Data

Jun. 26, 2008   (JP) .................. 2008-167078

(51) Int. Cl.
  *B29C 45/26*   (2006.01)
(52) U.S. Cl. ......... 425/184; 425/186; 425/191; 425/195
(58) Field of Classification Search .................. 425/184, 425/186, 191, 195
  See application file for complete search history.

(56) References Cited

U.S. PATENT DOCUMENTS

| | | | | |
|---|---|---|---|---|
| 3,387,323 A | * | 6/1968 | Wyllie et al. ................. | 425/577 |
| 3,524,220 A | * | 8/1970 | Davison ......................... | 425/78 |
| 3,593,366 A | * | 7/1971 | Smith ............................. | 425/78 |
| 3,744,950 A | * | 7/1973 | Courtois ....................... | 425/186 |
| 4,303,221 A | * | 12/1981 | Gallusser et al. ............ | 249/102 |
| 4,911,632 A | * | 3/1990 | Mansfield ..................... | 425/183 |
| 5,277,570 A | * | 1/1994 | Siggers ........................ | 425/195 |
| 5,783,224 A | * | 7/1998 | Heinlen et al. ............. | 425/192 R |
| 6,673,283 B2 | * | 1/2004 | Coel et al. .................... | 264/40.5 |
| 6,840,756 B2 | * | 1/2005 | Coel et al. .................... | 425/556 |
| 6,863,850 B2 | * | 3/2005 | Brown et al. ................ | 264/46.8 |
| 6,939,486 B2 | * | 9/2005 | DeRyke et al. ............... | 264/1.7 |
| 7,156,631 B2 | * | 1/2007 | Ozeki ............................ | 425/78 |
| 7,165,961 B2 | * | 1/2007 | Jachimski .................... | 425/193 |
| 7,171,894 B2 | * | 2/2007 | Uratani ......................... | 101/4 |
| 7,252,495 B2 | * | 8/2007 | Chiang ......................... | 425/195 |
| 2003/0082986 A1 | * | 5/2003 | Wiens et al. ................. | 446/120 |
| 2008/0260884 A1 | * | 10/2008 | Dannebey et al. ........... | 425/195 |

FOREIGN PATENT DOCUMENTS

JP    2007-059753 A    3/2007

* cited by examiner

*Primary Examiner* — Yogendra Gupta
*Assistant Examiner* — Emmanuel S Luk
(74) *Attorney, Agent, or Firm* — Sughrue Mion, PLLC (57) ABSTRACT

A mold unit is provided for molding an object part to be molded which is arranged on an object. The mold unit includes: a fixed core, having a dividing surface thereon; a molding die which is incorporated in the fixed core to mold the object part to be molded; and an auxiliary die interposed between the molding die and the dividing surface of the fixed core to ensure a positional accuracy of the object part to be molded with respect to the object by modifying the auxiliary die.

9 Claims, 8 Drawing Sheets

MOLD UNIT AND MODULE FOR ELECTRICAL CONNECTION

BACKGROUND OF THE INVENTION

1. Technical Field

The present invention relates to a mold unit which is employed in molding a resin molded product, and also relates to a module for electrical connection including a housing which is obtained by resin molding employing the mold unit and used for assembling various components for electrical connection, and snap fits which are integrally formed on the housing for assembling the components.

2. Background Art

As a representative example of the module for electrical connection which is constructed by assembling various components for electrical connection such as bus bars, terminals, and circuit boards, there is an electrical junction box which is used in a wiring system in a vehicle, for example.

Figure 5:
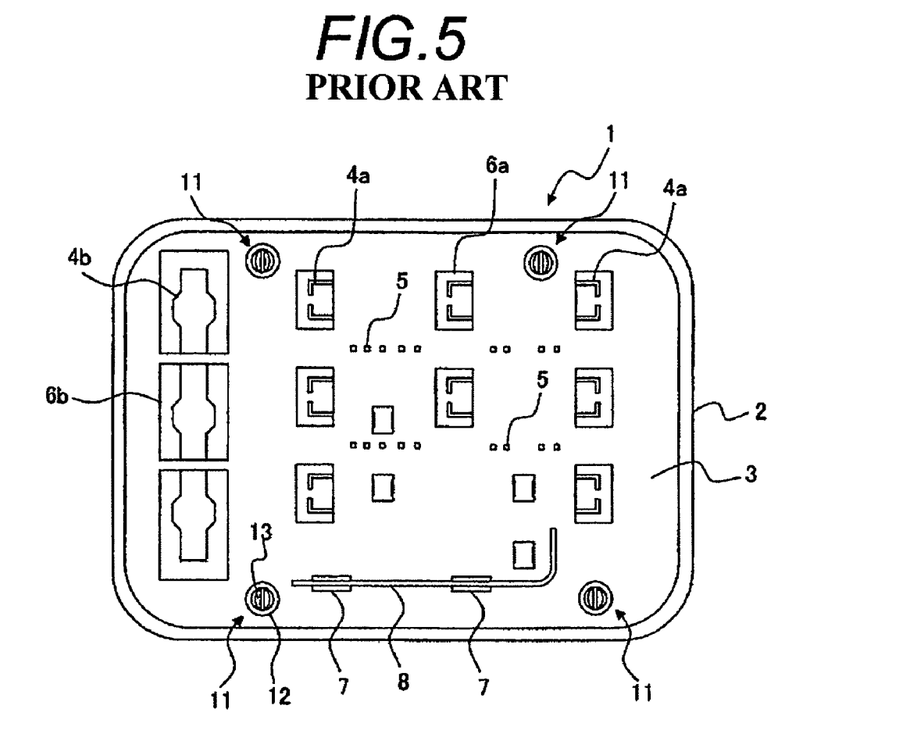
FIG. 5 schematically shows an electrical junction box of background art.

A representative example of structure of the electrical junction box is shown in FIG. 5. An electrical junction box 1 in this example includes a housing 2 which is obtained by resin molding. The housing 2 has a component assembling part 3 to which electrically conductive elements such as bus bars 4 (bus bars 4a, 4b, and so on) and terminals 5 are assembled by insert molding. portions of the bus bars 4a, 4b are respectively exposed from windows 6 (windows 6a, 6b, and so on) provided in the component assembling part 3. Moreover, a fit-in mounting part 7 is provided in the component assembling part 3, and a bus bar 8 to be fitted later is assembled to this fit-in mounting part 7 by fit-in mounting, as an electrically conductive element to be fitted later by non-inserting. Further, snap fits 11 are integrally formed at four positions in the component assembling part 3 so that the components such as circuit boards, which are not shown, can be assembled in a snap-fitting structure, by means of these snap fits 11 at the four positions.

Figure 6A:
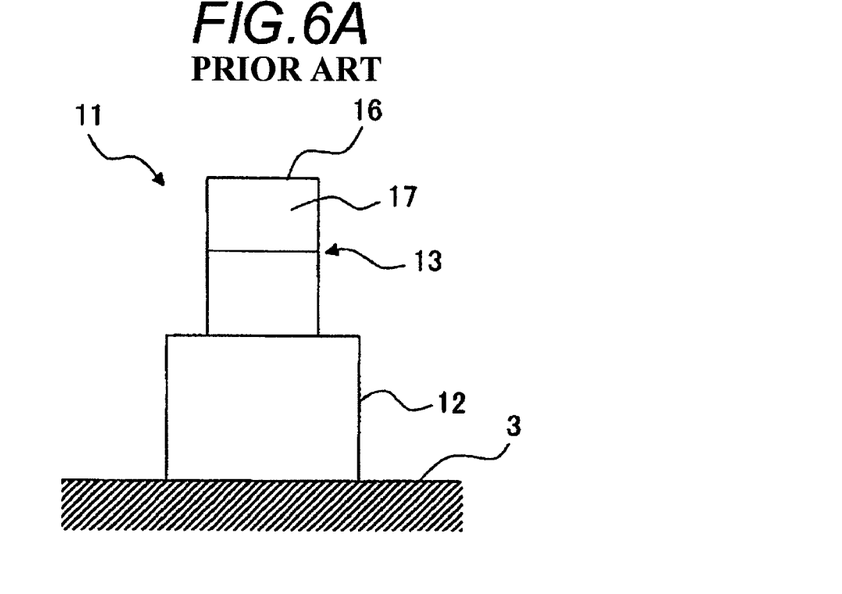
FIGS. 6A and 6B are enlarged views showing a snap fit in the electrical junction box in FIG. 5, as seen from its side faces.
Figure 6B:
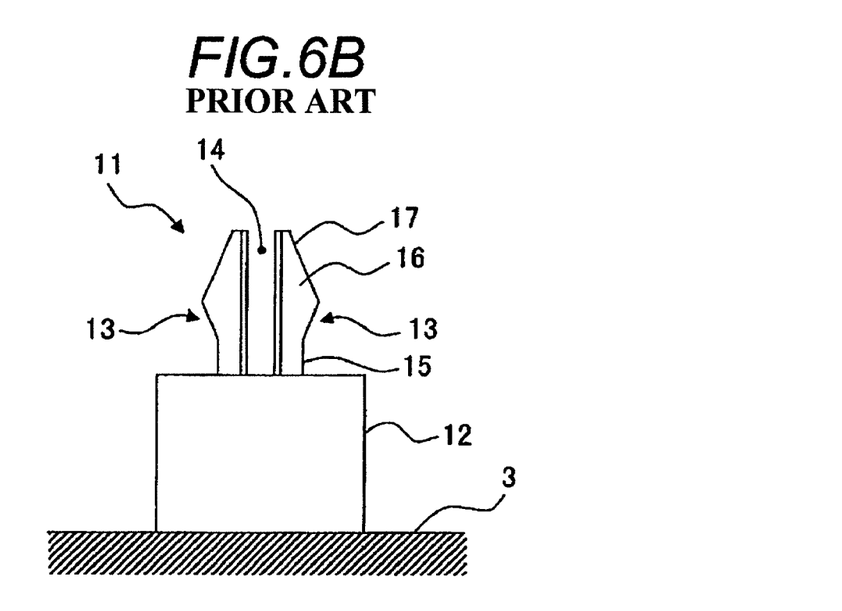

As shown in an enlarged view in FIGS. 6A and 6B, each of the snap fit 11 has a base part 12 in a columnar shape which is integrally formed in the component assembling part 3, and a pair of snap pieces 13, 13 which are extended from the base part 12 axially symmetrically in a manner of interposing a deforming gap 14 between them. The snap pieces 13, 13 respectively have leg portions 15 and locking head portions 16, and are so constructed that taper faces 17 formed on the locking head portions 16 are pressure-contacted to an assembling hole which is formed in the mating component to be assembled (not shown), whereby the snap pieces 13, 13 are deformed into a state where the deforming gap 14 is narrowed.

In integrally molding the snap fits 11 in the component assembling part 3 at a time of molding the housing 2, it is unavoidable that an error to a certain extent may occur in the positions of the snap fits 11, due to molding conditions, and shrinkage or deformation of the resin at a time of molding, depending on a type of the resin to be used. By the way, in case of the electrical junction box, high accuracy is required in assembling the components, and accordingly, high accuracy is also required as for the positions of the snap fits 11. Therefore, it is necessary to modify a mold unit (hereinafter, appropriately referred to as "the mold") according to the positional error of the snap fits in a molded product which has been produced as a prototype. However, there is a problem that modification of the mold is extremely difficult, in case where the housing 2 of the electrical junction box 1 is produced by resin molding.

Figure 7:
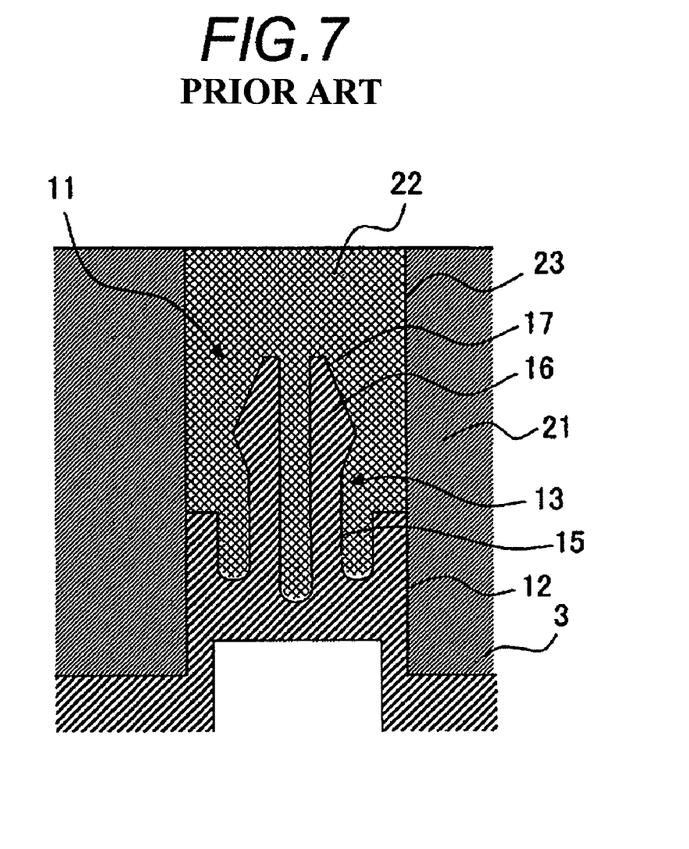
FIG. 7 schematically shows structure of a mold of the background art in a region where the snap fit is molded, as relation between the mold and the snap fit at a time of molding.
Figure 8:
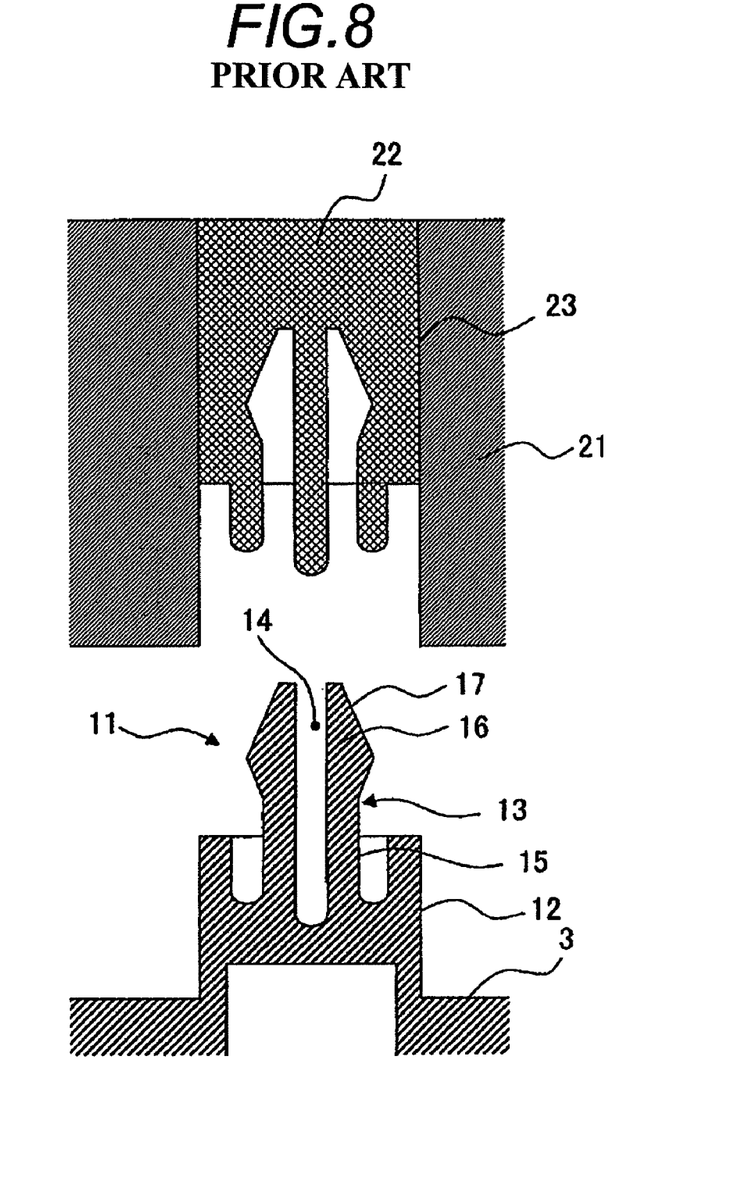
FIG. 8 is a view schematically showing the structure of the mold of the background art in the region where the snap fit is molded, as relation between the mold and the snap fit after molded.

In FIGS. 7 and 8, structure of a mold in a region where the snap fit is molded is shown. FIG. 7 shows relation between the mold and the snap fit 11 at a time of molding, and FIG. 8 shows relation between the mold and the snap fit 11 after molded. The mold in the region where the snap fit is molded is so constructed that a snap fit die 22 for molding the snap fit 11 is incorporated in a fixed core 21. From such structure of the mold, it is unavoidable that the region for molding the snap fit is positioned on a dividing surface 23 of the mold, which is a factor responsible for making modification of the mold extremely difficult.

As an art for assembling the circuit boards in the snap-fitting structure, there has been known, for example, the art disclosed in JP-A-2007-59753.

As described above, in case where the snap fits for assembling the components are formed, by integral molding, in the housing of the module for electrical connection such as the electrical junction box which is formed by resin molding, there has been such a problem that modification of the mold for eliminating the positional error of the snap fit is extremely difficult, because the region where the snap fit is molded is positioned on the dividing surface of the mold. Therefore, it has been required to solve this problem.

SUMMARY OF THE INVENTION

The invention has been made to meet such a requirement, and it is a first object of the invention to provide a mold unit in which modification of a mold for eliminating a positional error of a part to be molded such as a snap fit, of which high positional accuracy is required, can be easily conducted, without being affected by a dividing surface of the mold, and it is a second object of the invention to provide a module for electrical connection which can be molded employing such mold unit.

To achieve the first object of the invention, there is provided a mold unit for molding an object part to be molded which is arranged on an object, the mold unit including: a fixed core, having a dividing surface thereon; a molding die which is incorporated in the fixed core to mold the object part to be molded; and an auxiliary die interposed between the molding die and the dividing surface of the fixed core to ensure a positional accuracy of the object part to be molded with respect to the object by modifying the auxiliary die.

In the mold unit as described above, it is possible to secure positional accuracy of the part to be molded, by modifying the auxiliary die which is interposed between the fixed core and the molding die for molding the part to be molded, of which high positional accuracy is required. Therefore, the object to be molded can be designed in such a manner that the molded part on the object to be molded which is molded by the auxiliary die may be the molded part of which high accuracy is not required, whereby modification of the mold for eliminating the positional error of the part to be molded, of which high positional accuracy is required, can be easily conducted, without being affected by a dividing surface of the mold.

The mold unit as described above is particularly suitable for molding the housing of the module for electrical connection. Therefore, in a preferred embodiment of the invention, there is provided a mold unit for molding a snap fit to be formed integrally with a component assembling part on a housing of a module for electrical connection, the mold unit including: a fixed core, having a dividing surface thereon; a snap fit die which is incorporated in the fixed core to mold the snap fit; and a snap fit pedestal die interposed between the snap fit die and the dividing surface of the fixed core to ensure a positional accuracy of the snap fit with respect to the component assembling part by modifying the snap fit pedestal die.

In the mold unit, the snap fit pedestal die may be dent toward a direction parallel to an extending direction of the snap fit to form a snap fit pedestal projecting from a surface of the component assembling part so that an end edge portion of the snap fit pedestal projects from a side surface of a base part of the snap fit in a given width and the snap fit pedestal has a larger area than a bottom area of the base part.

Further, in order to achieve the second object of the invention, there is provided a module for electrical connection, including: a housing; a component assembly part arranged on the housing; a snap fit pedestal integrally formed on the component assembly; and a snap fit which is integrally formed on the snap fit pedestal and through which a component is assembled to the module, wherein the snap fit pedestal projects from a surface of the component assembling part toward a direction parallel to an extending direction of the snap fit, and an end edge portion of the snap fit pedestal projects from a side surface of the snap fit in a given width so that the snap fit pedestal has a larger area than a bottom area of the base part.

In the module for electrical connection as described above, the snap fit pedestal die for molding the snap fit pedestal is incorporated in the mold structure in the region where the snap fit is molded. In short, in the mold structure, the snap fit pedestal die is interposed between the fixed core and the snap fit die. Moreover, high accuracy is not required in the snap fit pedestal die, because high accuracy is not required in a shape of the snap fit pedestal in a plan view, specifically, high accuracy is not required with respect to a protruding extent of the end edge portion of the snap fit pedestal from the side face of the base part of the snap fit. For this reason, the shape and size of the snap fit pedestal die can be easily modified, and hence, the modification of the mold for eliminating a positional error of the snap fit can be easily conducted, without being affected by the dividing surface of the mold, by modifying the snap fit pedestal die.

According to the invention as described above, the modification of the mold for eliminating a positional error of the part to be molded such as the snap fit, of which high positional accuracy is required, can be easily conducted, without being affected by the dividing surface of the mold.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION OF THE PREFERRED EMBODIMENTS

Figure 1:
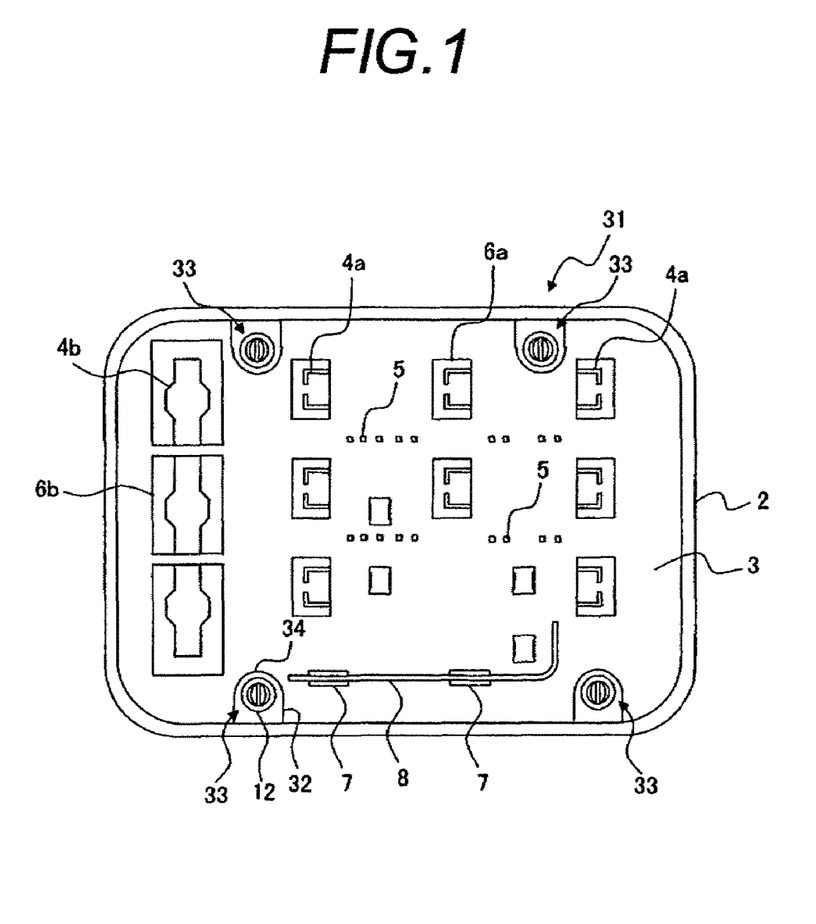
FIG. 1 schematically shows a structure of an electrical junction box which is a module for electrical connection in an embodiment according to the invention.

Now, an embodiment for carrying out the invention will be described. FIG. 1 shows structure of an electrical junction box 31 which is a module for electrical connection according to an embodiment of the invention. It is to be noted that essentially, the electrical junction box 31 is substantially the same as the electrical junction box 1 in FIG. 5, but different in that a snap fit 33 having a snap fit pedestal 32 is formed. Therefore, constituting elements which are common to the electrical junction box 1 will be denoted with the same reference numerals as in FIG. 5, and overlapped descriptions will be omitted.

Figure 2A:
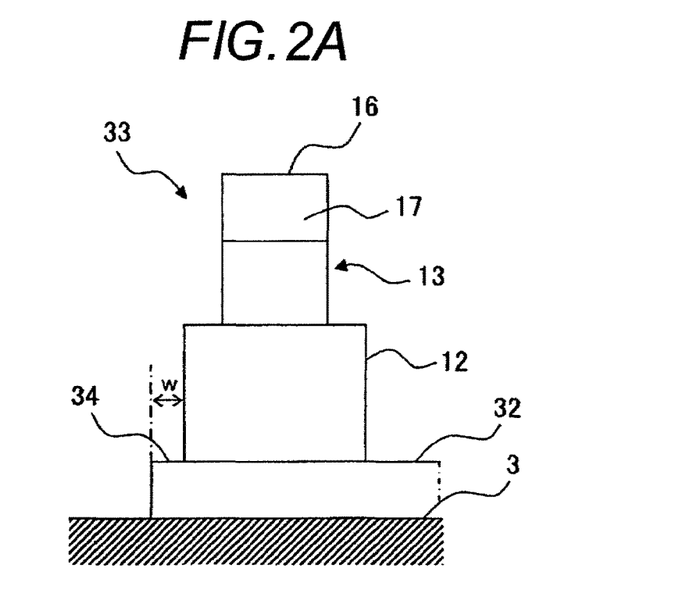
FIGS. 2A and 2B are enlarged views showing a snap fit in the electrical junction box in FIG. 1, as seen from its side faces.
Figure 2B:
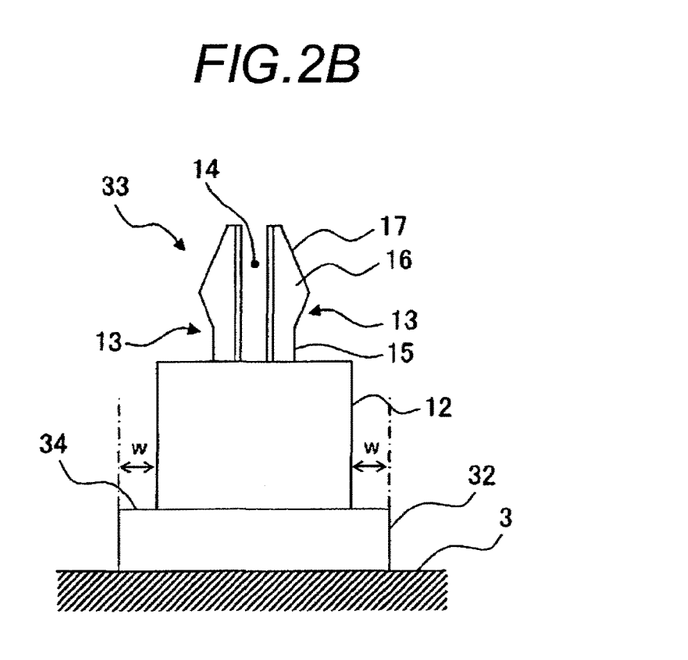

FIG. 2 shows the snap fit 33 in an enlarged state. The snap fit 33 is substantially the same as the snap fit 11 in FIG. 6, except that the snap fit 33 has the snap fit pedestal 32. Therefore, constituent elements which are common to the snap fit 11 will be denoted with the same reference numerals, and overlapped description will be omitted. As shown in FIGS. 2A and 2B, the snap fit 33 is formed on the snap fit pedestal 32 which is integrally formed in the component assembling part 3. The snap fit pedestal 32 has a larger area than a bottom area of the base part 12 of the snap fit 33, and is so formed as to project from a surface of the component assembling part 3. Moreover, an end edge portion 34 of the snap fit pedestal 32 is so formed as to protrude from a side surface of the base part 12 of the snap fit 33, by an appropriate projecting width w.

Figure 3:
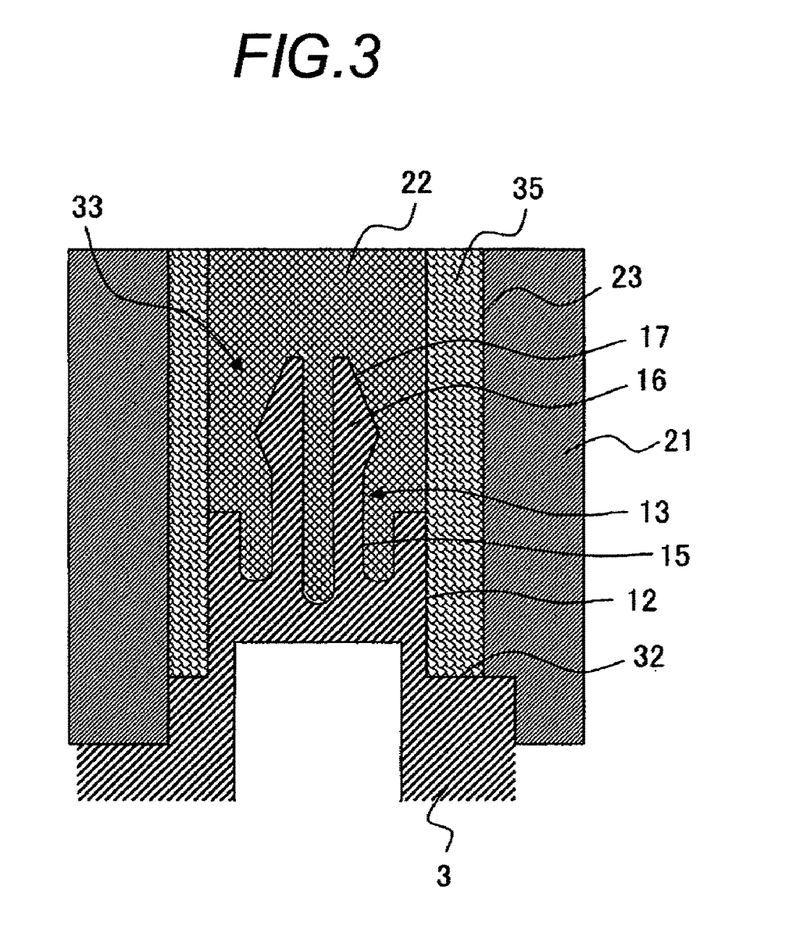
FIG. 3 schematically shows an example of structure of a mold in a region where the snap fit is molded, as relation between the mold and the snap fit at a time of molding.
Figure 4:
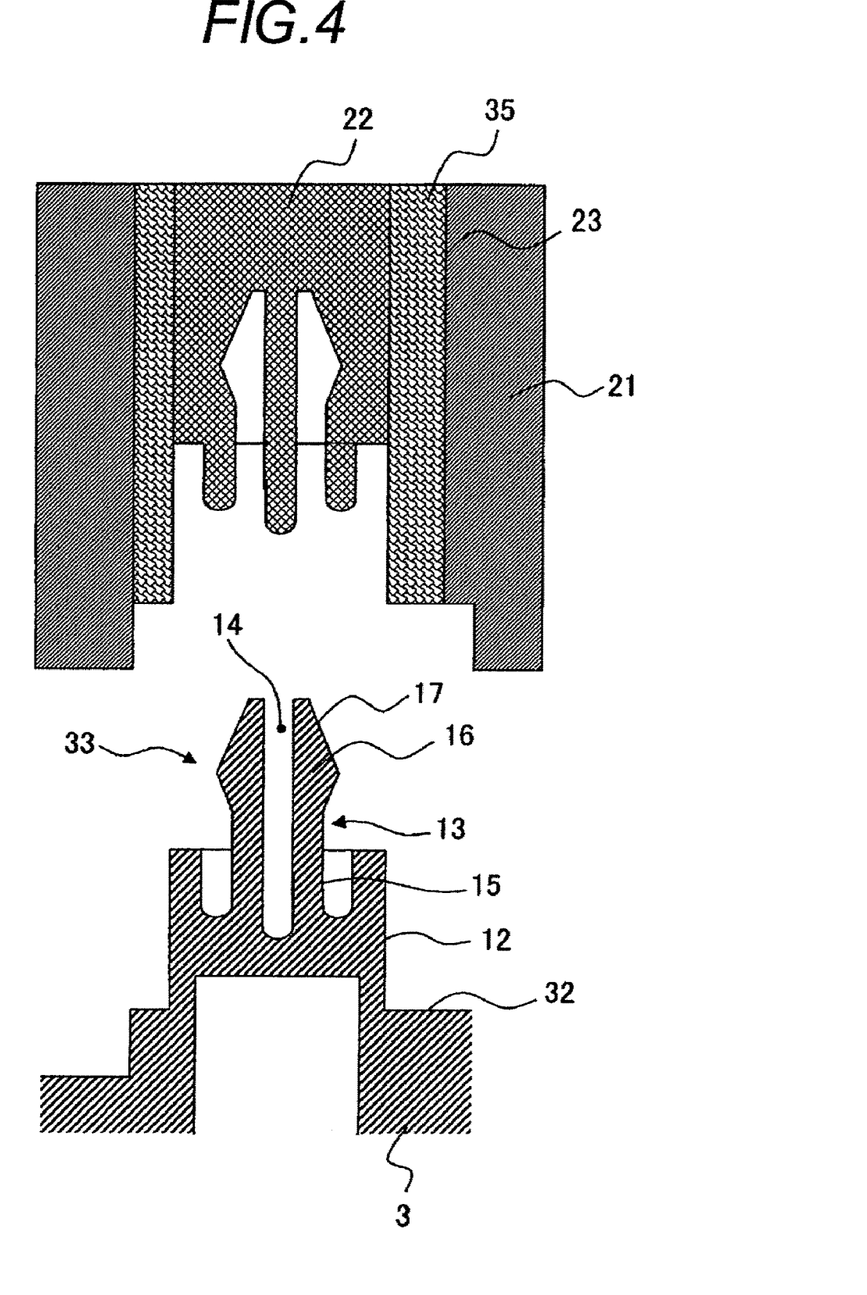
FIG. 4 schematically shows the example of the structure of the mold in the region where the snap fit is molded, as relation between the mold and the snap fit after molded.

In FIGS. 3 and 4, an example of structure of a mold in a region where the snap fit 33 is molded is shown. FIG. 3 shows relation between the mold and the snap fit 33 at a time of molding, and FIG. 4 shows relation between the mold and the snap fit 33, after molded. The mold as shown in the drawings is so constructed that a snap fit pedestal die 35 and a snap fit die 22 are incorporated in a fixed core 21 so that a dividing surface of the fixed core 21 is positioned between the fixed core 21 and the snap fit pedestal die 35. The snap fit pedestal die 35 is dent toward the upper direction in the drawings to form the snap fit pedestal 32 on the component assembling part 3. The mold having such structure is generalized as a mold which is so constructed that a molding die (corresponding to the snap fit die 22) for molding a part to be molded (corresponding to the snap fit 33 in the component assembling part 3 of the housing 2), of which high accuracy over a certain extent is required with respect to a position on an object to be molded is incorporated in a fixed core (corresponding to the fixed core 21), and an auxiliary die (corresponding to the snap fit pedestal die 35) is interposed between the molding die and the fixed core.

The snap fit pedestal die 35 is the auxiliary die for molding the snap fit pedestal 32, as described above, and incorporated so as to be interposed between the fixed core 21 and the snap fit die 22. High accuracy is not necessarily required in this snap fit pedestal die 35 which is the auxiliary die. This is because the protruding width w of the end edge portion 34 of the snap fit pedestal 32 need not be necessarily constant, which means that a shape of the snap fit pedestal 32 need not be necessarily constant in a plan view. A shape and a size of the snap fit pedestal die 35, of which high accuracy is not required, can be easily modified. Therefore, by modifying the shape and size of the snap fit pedestal die 35, it is possible to easily conduct modification of the mold for eliminating the positional error of the snap fit 33, without being affected by the dividing surface 23 of the mold.

Although the specific embodiment for carrying out the invention has been heretofore described, this is only a representative example. The invention can be carried out in various modes within a scope not deviating from the gist of the invention.

What is claimed is:

1. A mold unit for molding an object part to be molded which is arranged on an object, the mold unit comprising:
   a fixed core, having a dividing surface thereon which defines a hole;
   a molding die which is incorporated in the hole of the fixed core to mold the object part to be molded; and
   an auxiliary die interposed between the molding die and the dividing surface of the fixed core to ensure a positional accuracy of the object part to be molded with respect to the object by modifying the auxiliary die,
   wherein the auxiliary die has a smaller height than that of the fixed core so as to form a pedestal which is wider than a base part of the object part and projects from a surface of the object when the mold unit molds the object part.

2. The mold unit according to claim 1,
   wherein a bottom surface of the fixed core forms the surface of the object from which pedestal projects when the mold unit molds the object part, and
   wherein a portion of the dividing surface which extends from the bottom surface of the fixed core to a bottom surface of the auxiliary die and the bottom surface of the auxiliary die form the pedestal when the mold unit molds the object part.

3. The mold unit according to claim 1,
   wherein the mold unit is configured to mold the object part and the object simultaneously, and
   wherein the mold unit is configured such that at least a portion of the object is provided outside of the hole defined by the dividing surface of the fixed core during the molding.

4. The mold unit according to claim 3,
   wherein the hole extends in an axial direction, and
   wherein the mold unit is configured such that at least the portion of the object that is provided outside of the hole is provided away from the hole in a direction which is perpendicular to the axial direction.

5. A mold unit for molding a snap fit to be formed integrally with a component assembling part on a housing of a module for electrical connection, the mold unit comprising:
   a fixed core, having a dividing surface thereon which defines a hole;
   a snap fit die which is incorporated in the hole of the fixed core to mold the snap fit; and
   a snap fit pedestal die interposed between the snap fit die and the dividing surface of the fixed core to ensure a positional accuracy of the snap fit with respect to the component assembling part by modifying the snap fit pedestal die,
   wherein the snap fit pedestal die has a smaller height than that of the fixed core so as to form a snap fit pedestal which is wider than a bottom area of a base part of the snap fit and projects from a surface of the component assembling part when the mold unit molds the snap fit.

6. The mold unit according to claim 5, wherein the snap fit pedestal die is dent toward a direction parallel to an extending direction of the snap fit to form a snap fit pedestal projecting from a surface of the component assembling part so that an end edge portion of the snap fit pedestal projects from a side surface of a base part of the snap fit in a given width and the snap fit pedestal has a larger area than a bottom area of the base part.

7. The mold unit according to claim 5,
   wherein a bottom surface of the fixed core forms the surface of the component assembling part from which snap fit pedestal projects when the mold unit molds the snap fit, and
   wherein a portion of the dividing surface which extends from the bottom surface of the fixed core to a bottom surface of the snap fit die and the bottom surface of the snap fit die form the snap fit pedestal when the mold unit molds the object part.

8. The mold unit according to claim 2,
   wherein the mold unit is configured to mold the snap fit and the component assembling part simultaneously, and
   wherein the mold unit is configured such that at least a portion of the component assembling part is provided outside of the hole defined by the dividing surface of the fixed core during the molding.

9. The mold unit according to claim 8,
   wherein the hole extends in an axial direction, and
   wherein the mold unit is configured such that at least the portion of the component assembling part that is provided outside of the hole is provided away from the hole in a direction which is perpendicular to the axial direction.

* * * * *